(12) United States Patent
Nishino

(10) Patent No.: US 7,791,642 B2
(45) Date of Patent: Sep. 7, 2010

(54) IMAGE-TAKING APPARATUS

(75) Inventor: Naoyuki Nishino, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 682 days.

(21) Appl. No.: 11/299,738

(22) Filed: Dec. 13, 2005

(65) Prior Publication Data

US 2006/0125926 A1 Jun. 15, 2006

(30) Foreign Application Priority Data

Dec. 13, 2004 (JP) ............................ 2004-360185
Dec. 16, 2004 (JP) ............................ 2004-364277

(51) Int. Cl.
H04N 5/228 (2006.01)
G03B 17/00 (2006.01)
G02B 27/64 (2006.01)

(52) U.S. Cl. ............................ 348/208.13; 348/208.16; 348/208.1; 396/52; 396/55; 359/554; 359/557

(58) Field of Classification Search ............ 348/208.13, 348/208.16, 208.4, 154–155, 208.3, 211.9; 396/52–55; 359/554–557
See application file for complete search history.

(56) References Cited

U.S. PATENT DOCUMENTS

| 5,502,484 A * | 3/1996 | Okada ...................... 348/208.6 |
| 5,657,080 A * | 8/1997 | Sekine ...................... 348/208.5 |
| 5,842,054 A * | 11/1998 | Suzuki et al. ................. 396/55 |
| 5,959,666 A * | 9/1999 | Naganuma ............... 348/208.3 |
| 7,064,777 B2 * | 6/2006 | Yamazaki ................. 348/208.5 |
| 2002/0041334 A1 * | 4/2002 | Okawara ..................... 348/335 |
| 2002/0109782 A1 * | 8/2002 | Ejima et al. ............ 348/333.01 |
| 2004/0070675 A1 * | 4/2004 | Fredlund et al. ......... 348/208.1 |
| 2004/0160525 A1 * | 8/2004 | Kingetsu et al. ............. 348/364 |
| 2006/0044403 A1 * | 3/2006 | Hatanaka et al. ......... 348/208.4 |

FOREIGN PATENT DOCUMENTS

| JP | 10-240436 A | 9/1998 |
| JP | 11-153750 A | 6/1999 |
| JP | 2000-338387 A | 12/2000 |
| JP | 2003-202620 A | 7/2003 |
| JP | 2004-48526 A | 2/2004 |
| JP | 2004-72550 A | 3/2004 |

* cited by examiner

*Primary Examiner*—Lin Ye
*Assistant Examiner*—Mekonnen Dagnew
(74) *Attorney, Agent, or Firm*—Sughrue Mion, PLLC

(57) ABSTRACT

Provided is an image-taking apparatus having an easier human machine interface than before. Instead of operating an operator, a mode for a flash condition among multiple shooting conditions displayed on a display panel of a liquid crystal display device is switched from an automatic mode to a forced on mode by shaking a digital camera vertically. Then, the shooting condition is switched to a focusing condition by shaking the digital camera horizontally. The shooting condition is switched from the focusing condition to a white balance condition by shaking this image-taking apparatus horizontally again. Thereafter, a mode for the shooting condition is switched from a macro mode to a macro-off mode by shaking this image-taking apparatus vertically again. Likewise, it is possible to set up various modes for the respective shooting conditions by shaking this image-taking apparatus.

7 Claims, 7 Drawing Sheets

(a)

(b)

(a)

(b)

IMAGE-TAKING APPARATUS

BACKGROUND OF THE INVENTION

1. Field of the Invention

The present invention relates to an image-taking apparatus that includes an image pickup device and generates an image signal by forming an object image on the image pickup device.

2. Description of the Related Art

Along with the development of enhanced functions in digital cameras, digital cameras incorporating shake sensors (see Japanese Unexamined Patent Publication No. 2004-72550, for example) and digital cameras including multiple preset shooting conditions respectively incorporating multiple modes for facilitating various shooting works have been placed on the market. Although a digital camera including multiple preset shooting conditions allows various shooting works, it is becoming very difficult to select a particular shooting condition and a mode incorporated in the shooting condition before shooting. In order to relieve such a complicated operation as much as possible, there have been disclosed numerous techniques applying user-friendly human machine interfaces such as a touch panel to be operated by touching a screen of a digital camera (see Japanese Unexamined Patent Publication No. 2004-48526, for example).

However, due to the increase in the number of setting modes attributable to the development of enhanced functions, it is unavoidable to complicate operations in spite of the improvement to perform setting by the touch panel operations.

Meanwhile, many image-taking apparatus include a function to adjust focus automatically, or so-called an auto focus (hereinafter referred to as AF) function in recent years. Those image-taking apparatus including the AF function include a type configured to perform focus adjustment through a photographic lens or to perform so-called through-the-lens (TTL) ranging, a type configured to perform ranging by providing multipoint ranging sensors outside a photographic light path and detecting a displacement of focused positions out of a shooting object as a phase difference (see Japanese Unexamined Patent Publication No. 11(1999)-153750). The technique according to Japanese Unexamined Patent Publication No. 11(1999)-153750 is configured to arrange multiple licensors, which are light receiving elements, depending on multiple ranging areas and to detect displacements of the focused positions of the single shooting object as the phase differences. Meanwhile, among the types configured to perform the TTL ranging, there is a type configured to apply an image pickup device as a passive-type ranging sensor and to perform shooting while automatically focusing on a region of a shooting object that shows the highest shooting object contrast (see Japanese Unexamined Patent Publication No. 2000-338387, for example). In addition, there is also a type configured to designate a ranging area by operating an operator such as an arrow key toward a certain zone in a measurable range of the image pickup device while utilizing the fact that the measurable range of the image pickup device being the passive-type ranging sensor encompasses the entire region of the shooting object, and thereby to adjust the focus such that the ranging area is set to a focused state (see Japanese Unexamined Patent Publication No. 2004-048526, for example). Moreover, among the image-taking apparatus having the AF function as described in Japanese Unexamined Patent Publication No. 11(1999)-153750, there is also a type configured to designate a ranging area by operating an operator such as an arrow key, and thereby to adjust the focus such that the ranging area is set to a focused state.

In any case, the mode configured to set up the measuring area freely will be hereinafter referred to as a wide-area AF mode in this specification.

FIG. 1 is a view showing a display screen 200 of a digital camera which is visually checked instead of a viewfinder.

Assuming that five ranging areas arranged in a cross formation are displayed on the display screen 200 shown in FIG. 1 so as to overlap a shooting object and that the mode configured to automatically focus on the region having the highest object contrast (such a mode will be hereinafter referred to an automatic AF mode) as described previously is designated, a position of a focusing lens is adjusted such that a ranging area where the highest shooting object contrast is obtained among the five ranging areas is set to a focused point.

When this automatic AF mode is designated, even in the case of attempting to focus on a bride and a groom in an upper left position shown in FIG. 1, the contrast becomes the highest in a lower right position shown in FIG. 1 between a lighted candle and a background, whereby an image tends to be shot while focusing on that position. In this case, faces of the bride and the groom may be captured within a depth of field but shot slightly out of focus.

Meanwhile, assuming that a ranging area is located fixedly in the center (such a mode will be hereinafter referred to as a one-point AF mode) and that mode is designated, an image is shot while adjusting a position of a focusing lens such that the ranging area in the center is set to a focused state. In this case, the focus may be set to an infinite position if the focusing position is set to the center.

Accordingly, when these problems are likely to occur, it is effective to reduce shooting failure by selecting the wide-area AF mode to set up the ranging area to a favorite position of a user. However, in the case of selecting one out of the five ranging areas designated in the wide-area AF mode by operating the arrow key or a touch panel as disclosed in Japanese Unexamined Patent Publication No. 2004-048526, it is necessary to take a finger off from a release button once and to concentrate on operating the arrow key or operating the touch panel when the bride, the groom and other people around them constitute the shooting object as shown in FIG. 1, for example. In this case, the user may squander a chance for a good shot if the bride and the groom move to another position or change postures in the course of the operation.

SUMMARY OF THE INVENTION

The present invention has been made in view of the above circumstances and provides an image-taking apparatus having a human machine interface which is easier to use than before.

An image-taking apparatus according to a first aspect of the present invention is an image-taking apparatus which focuses an image on an image pickup device by use of an image-taking optical system and thereby generates an image signal, which includes a sensor which detects vibration of the image-taking apparatus, and a mode setting section which sets up a mode respectively in terms of multiple shooting conditions. Here, the mode setting section switches a shooting condition out of the multiple shooting conditions including a mode subject to setting and the mode in the shooting condition in response to the vibration detected by the sensor.

According to the image-taking apparatus of to the first aspect of the present invention, it is possible to switch the shooting condition and the mode in the shooting condition in response to the vibration detected by the sensor. Therefore, it is not necessary to switch the mode without being bothered by operating an operator, and the mode is automatically switched by shaking the image-taking apparatus. In this way, it is possible to realize an image-taking apparatus having an excellent human machine interface.

Moreover, many image-taking apparatus of this type include display devices. Accordingly, when the shooting condition including the mode subject to setting among the multiple shooting conditions and the multiple modes in the shooting condition are displayed on a display screen of the display device included in one of the image-taking apparatus, it is possible to set up the mode by a simple operation of shaking the image-taking apparatus while looking at the mode subject to setting. In this way, it is possible to set up the mode by the simple operation of shaking the image-taking apparatus, using a visual effect, and thereby to realize the image-taking apparatus having a more excellent human machine interface.

Here, the sensor may be a sensor which detects a shake, and this image-taking apparatus may include a shake correcting section which detects a shake by use of the sensor and corrects the shake. Alternatively, the sensor may be a sensor configured to detect vibration at least in two directions depending on the respective directions, and the mode setting section may be configured to switch the shooting condition including the mode subject to setting when vibration in a predetermined first direction is detected by the sensor, and to switch the mode in the currently selected shooting condition when a signal in a second direction different from the first direction is detected by the sensor.

As the sensor configured to detect the vibration at least in the two directions, it is possible to apply a sensor such as a gyro sensor or an angular acceleration sensor.

Meanwhile, an image-taking apparatus according to a second aspect of the present invention is an image-taking apparatus including an image pickup device which generates an image signal upon receipt of irradiation of a shooting object image, an image-taking optical system which includes an optical member for focus adjustment and focuses the shooting object image on the image pickup device, a shooting section which causes the image pickup device to generate a recording image signal and records the recording image signal in response to a shooting operation, and a focus adjusting section which performs focus adjustment by driving the optical member such that a ranging area defined within a shooting field angle constitutes a focused position. Here, the image-taking apparatus includes a sensor which detects vibration of the image-taking apparatus, and the focus adjusting section switches the ranging area in response to the vibration detected by the sensor.

According to the image-taking apparatus of the second aspect, the focus adjusting section switches the ranging areas shown in FIG. 1, for example, sequentially in response to the vibration detected by the sensor.

That is, when holding this image-taking apparatus, it is possible to switch the ranging area automatically by shaking this image-taking apparatus several times to cause the vibration.

Therefore, it is possible to switch the ranging area by viewing a panel instead of a finder while holding this image-taking apparatus and placing a finger on a release button. When a user can set up the ranging area promptly while placing the finger on the release button, it is possible to avoid the finger from detaching from the release button while performing the operation to set up the ranging area, and thereby to press the release button immediately after setting up the ranging area for shooting.

As described above, it is possible to realize the image-taking apparatus having an easier human machine interface than before, which is capable of shooting an image without missing a chance for a good shot in the course of the operation to set up the ranging area to any position within the shooting field angle.

Here, in terms of the image-taking apparatus of the second aspect, the sensor is preferably a sensor which detects a shake, and this image-taking apparatus preferably includes a shake correcting section which detects the shake by use of the sensor and corrects the shake.

A shake detection sensor can be used as the sensor. Since many digital cameras incorporate such shake detection sensors for correcting the shake, it is possible to use the shake detection sensor as the sensor for detecting the vibration. In this way, it is possible to reduce the number of components and to reduce costs of the whole image-taking apparatus.

Although the foregoing image-taking apparatus of the second aspect is configured to switch the ranging area in response to the vibration detected by the sensor, the sensor may be a sensor configured to detect a direction of the vibration, and the focus adjusting section may be configured to switch the ranging area to the direction detected by the sensor.

Assuming that the sensor is the sensor configured to detect the direction of the vibration, the direction is detected by the sensor when the way of shaking this image-taking apparatus is changed, and the ranging area is switched to the relevant direction. Accordingly, it is possible to improve operability to switch the ranging area to the direction of another ranging area intended by the user. Moreover, it is possible to switch the ranging area promptly and to grab a chance for a good shot more reliably.

As described above, according to the image-taking apparatus of the first or second aspect of the present invention, it is possible to realize the image-taking apparatus having the human machine interface easier to use than before.

Particularly, in the case of the image-taking apparatus according to the second aspect of the present invention, it is possible to realize the image-taking apparatus which can reduce failure by missing a chance for a good shot when performing the operation to set up the ranging area to any position within the shooting field angle.

DETAILED DESCRIPTION OF THE INVENTION

Now, embodiments of the present invention will be described.

Figure 2:
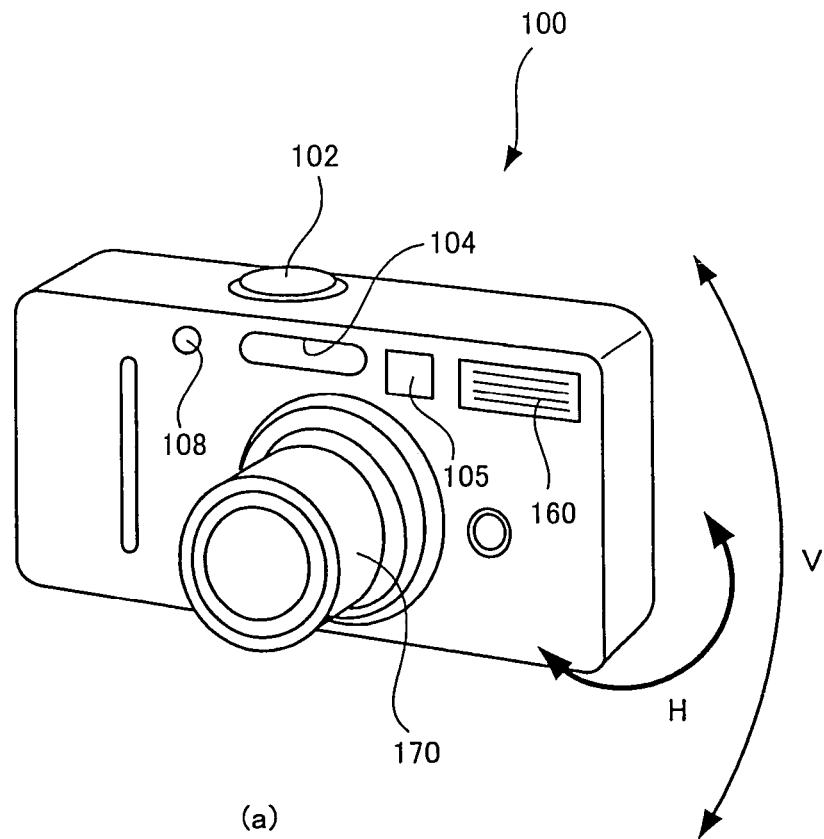
FIG. 2 is a view showing a digital camera which represents an image-taking apparatus according to an embodiment of the present invention.
Figure 2:
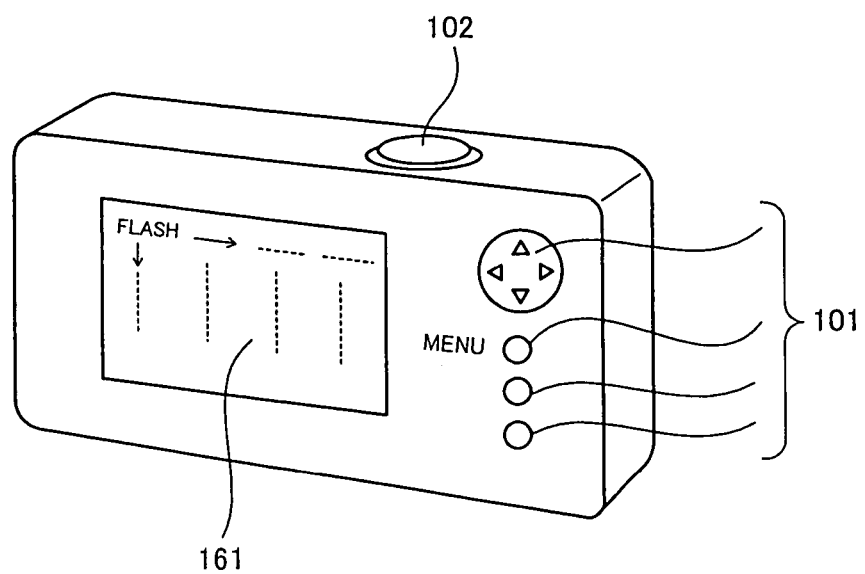

FIG. 2 is a view showing a digital camera which represents an image-taking apparatus according to an embodiment of the present invention.

FIG. 2 is a perspective view of the digital camera according to the embodiment of the present invention.

Part (a) of FIG. 2 shows appearance of a front face of a camera body, and part (b) of FIG. 2 shows a back face of the camera body.

A lens barrel 170 is disposed in the center of the body of a digital camera 100 shown in part (a) of FIG. 2. The lens barrel 170 incorporates an image-taking optical system, and an image of a shooting object is guided through the image-taking optical system to a charge-coupled-device solid pickup device (hereinafter referred to as a CCD) disposed inside the digital camera 100. Meanwhile, a finder 105 and a flash window on which a protector 160 is fitted in a frame are disposed above the lens barrel 170.

A release button 102 included in the digital camera 100 of this embodiment and disposed on an upper face of the camera body allows two aspects of half-push and full-push operations. Specifically, the release button 102 is configured to perform the TTL ranging, to detect a focused position, and to locate a focusing lens to the focused position by the half-push operation. Moreover, the release button 102 is configured to cause the CCD to perform exposure in response to the full-push operation after performing the TTL ranging and adjusting an aperture of the lens.

Meanwhile, a display panel 161 used instead of a finder is disposed on the digital camera 100 of this embodiment as shown in part (b) of FIG. 2. The display panel 161 is also configured to display a menu screen in response to an operation of a menu button among a group 101 of switches located beside the display panel 161. In the group 101 of switches, an arrow key for selecting any of selection items in the menu screen, a cancel key, a decision button and the like are also arranged. Multiple shooting conditions and numerous modes in terms of the respective shooting conditions are displayed on this menu screen.

Meanwhile, a shake detection sensor is disposed inside this digital camera. In the digital camera of this embodiment, the shake detection sensor is configured not only to detect a shake when shooting an image but also to switch and set up a shooting condition including a mode subject to setting among the multiple shooting conditions on the menu screen and the mode in the shooting condition in response to vibration caused by intentionally shaking this image-taking apparatus and detected by the shake detection sensor when the menu screen is displayed on the display panel before shooting the image. Details will be described later.

In addition, the digital camera 100 of this embodiment is provided with a window 104 for guiding light to a flash adjustment sensor and an AF assist light window 108 for irradiating AF assist light toward the shooting object.

Figure 3:
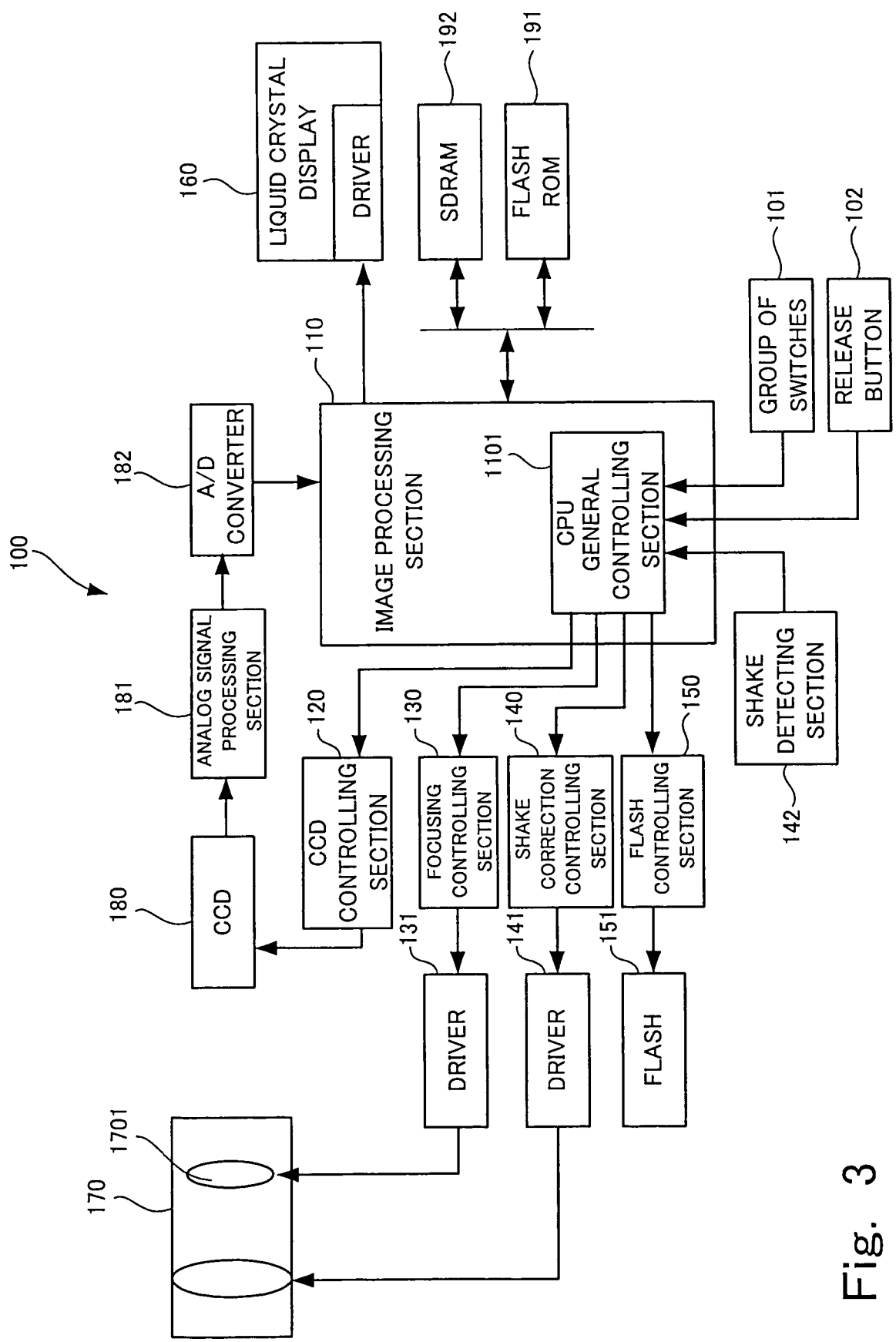
FIG. 3 is a view showing a configuration of a signal processing section embedded inside the digital camera shown in FIG. 2.

FIG. 3 is a view showing a configuration of a signal processing section embedded inside the digital camera shown in FIG. 2.

The configuration of the signal processing section inside the digital camera 100 will be described with reference to FIG. 3.

In the digital camera 100 of this embodiment, all the processing is generally controlled by a central processing unit (CPU) 1101 in an image processing section 110, and operation signals from the group 101 of various switches of an operating section shown in part (b) of FIG. 2 and a shake detection signal from a shake detecting section 142 including the shake detection sensor are respectively supplied to an input section of this main CPU 1101. The shake detection sensor included in the digital camera of this embodiment can detect vibration in two directions (an H direction and a V direction shown in FIG. 2) depending on the respective directions. The CPU 1101 is configured to switch the shooting condition including the mode subject to setting among the shooting conditions displayed on the menu screen shown in FIG. 4 to be described later when vibration in a predetermined first direction (the H direction) is detected by the shake detection sensor, and moreover, to switch the mode in the currently selected shooting condition when a signal in a second direction (the V direction) different from the first direction is detected by the shake detection sensor.

Meanwhile, a CCD controlling section 120, a focusing controlling section 130, a shake correction controlling section 140, a flash controlling section 150, and the like are connected to an output section of the CPU 1101. Control signals are outputted appropriately from the output section of the CPU 1101 in response to the input signals, whereby operations of the CCD controlling section 120, the focusing controlling section 130, the shake correction controlling section 140, the flash controlling section 150, and the like are independently controlled. When a shake occurs in the course of shooting, the CPU 1101 issues an instruction to the shake correction controlling section 140 in response of the state of the shake detected by the shake detecting section 142, and the shake correction is performed by causing a driver 141 to drive a shake correction lens, for example. The shake correction controlling section 140, the driver 141, and the shake correction lens collectively constitute a shake correcting section of the present invention. At the same time, a liquid crystal display device (hereinafter referred to as LCD) 160 configured to display numerous setting modes in terms of the multiple shooting conditions on the display panel 161 before shooting and to display cursors for switching the shooting condition, switching the mode included in the shooting condition, and so forth is also connected to the output section of the CPU 1101. A signal is outputted from the output section of the CPU 1101 to this LCD 160 as well, whereby an operation of the LCD 160 is controlled by the CPU 1101.

Note that FIG. 3 shows the configuration in which the CPU 1101 (in the form of an integrated circuit (IC) designed for a specific purpose such as an application specific integrated circuit (ASIC)) is embedded in the image processing section 110, and this configuration shows that the image processing section 110 and the CPU 1101 are operated cooperatively with each other.

The CPU 1101 inside the image processing section 110 includes a flash read-only memory (FLASHROM) 191 which is a program memory, and programs required for operating the digital camera 100 are written in this FLASHROM 191. When a power switch of the digital camera 100 having the above-described configuration is turned on, operations of the entire digital camera 100 are controlled by the CPU 1101 in accordance with procedures of the programs in the FLASHROM 191. A program indicating procedures concerning menu display is written in these programs. The CPU 1101, the LCD 160, the flash memory 191, and the shake detecting section 142 including the shake detection sensor collectively constitute a mode setting section of the present invention.

Meanwhile, in addition to the flash memory 191, a synchronous dynamic random access memory (SDRAM) 192 for temporarily storing the entire image signal is disposed because there may be a case where a CCD 180 of this embodiment has a large number of pixels which cannot be fully processed only by use of a frame memory in the image processing section 110.

Here, moving the viewpoint away from FIG. 3, description will be given of that what kinds of setting items are displayed on the display panel of the LCD by the mode setting section in an attempt to set up the mode in terms of the respective shooting conditions and as to how the mode is set up will be described with reference to FIGS. 4 and 5.

Figure 4:
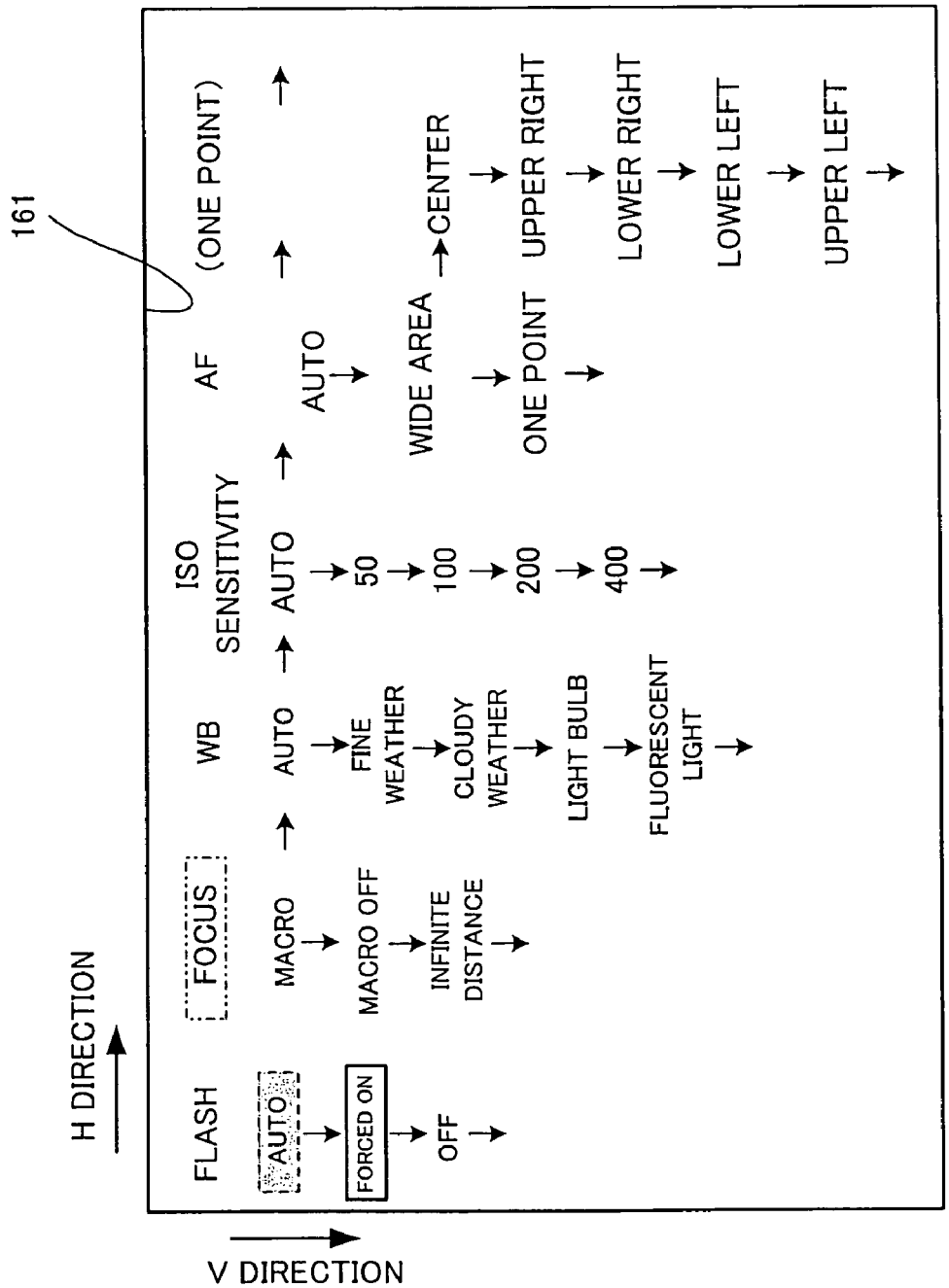
FIG. 4 is a view showing a menu screen to be displayed on a display panel of an LCD (liquid crystal display).

FIG. 4 is a view showing the menu screen to be displayed on the display panel of the LCD 160. Meanwhile, FIG. 5 is a view showing an AE (auto exposure) mode which is equivalent to a shooting condition subsequent to a (one point) condition among shooting conditions shown in FIG. 4. In this example, when a position indicating the (one point) condition on the menu screen in FIG. 4 is designated, the screen is scrolled to the left side and indicators for flash items and focus items disappear. Then, the screen as shown in FIG. 5 is displayed.

Figure 5:
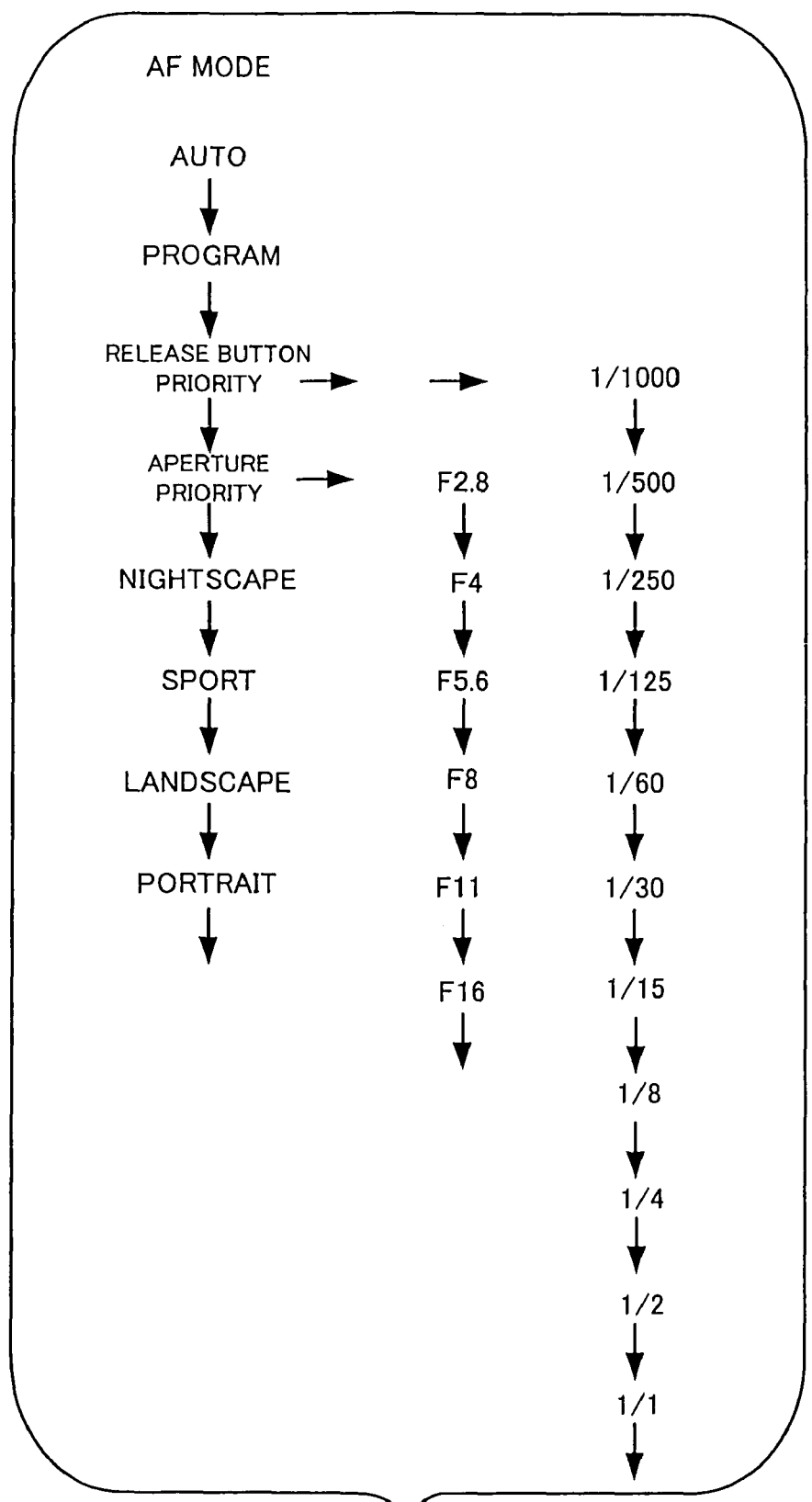
FIG. 5 is a view showing an AE (auto exposure) mode which is equivalent to a shooting condition subsequent to a (one point) condition among shooting conditions shown in FIG. 4.

FIGS. 4 and 5 show the multiple shooting conditions and the multiple types of modes included in the respective shooting conditions to be displayed on the display panel 161 of the LCD 160, which are arrayed in the hierarchical order.

In this example, when setting a flash condition as the shooting condition, one mode is selected from three modes including an automatic mode, a forced on mode, and an off mode. For instance, when a cursor displayed on the display panel 161 of the LCD 160 is located on the automatic mode (indicated with a dotted line) among the modes for the flash condition, the automatic mode is switched to the forced on mode when this digital camera 100 is shaken once in the V direction. FIG. 4 shows an aspect that the cursor (the dotted line) located on the automatic mode is shifted to the forced on mode (the cursor indicated with a solid line).

When the digital camera 100 in this state is shaken in the H direction in an attempt to set up a mode in another shooting condition, the shooting condition is switched to a column of a focusing condition while setting up the forced on mode as the mode of the flash condition. Similarly, when this digital camera is shaken again in the H direction, the shooting condition is sequentially switched to WB, ISO sensitivity, AF, one point (a position in a ranging area in a wide area), and to AE as shown in FIG. 4, for example. When this digital camera 100 is shaken in the V direction in a location of any of the shooting conditions, the setting mode is sequentially switched in terms of the relevant shooting condition.

This digital camera performs image shooting after setting the shooting conditions as described above.

Now, back to FIG. 3, descriptions will be given of that a flow of an image signal at the time of image shooting based on the shooting conditions which are set up before shooting by use of the menu screen on the display panel 161 of the LCD 160, with reference to FIG. 3.

When the power switch among the group 101 of switches is turned on, electricity is supplied from a power source (not shown) to the CCD 180 and the like. If a mode lever among the group 101 of switches is shifted to a shooting side when turning the power source on, an shooting object image formed on the CCD 180 is outputted to a later stage as an image signal extracted by thinning out the image at a given interval, and a shooting object image based on the outputted image signal is displayed on the display panel 161 (see FIG. 2) of the LCD 160. A timing signal is supplied from the CCD controlling section 120 to this CCD 180, and the image signal is extracted at the given interval and then outputted based on this timing signal. This CCD controlling section 120 outputs the timing signal to the CCD 180 based on an instruction from the CPU 1101, whereby the CCD performs exposure and outputs the image signal in response to the timing signal.

In this way, the analog image signal is outputted from the CCD 180 to an analog signal processing section 181 located at a later stage. After this analog signal processing section 181 performs noise reduction processing and the like, the analog image signal subjected to the noise reduction processing and the like is converted into a digital image signal by an A/D converter 182. This digital image signal is supplied to the image processing section 110, and the image processing is conducted by this image processing section 110.

The image processing includes a process to convert an RGB signal being the analog image signal into an YC signal, a white balance (WB) process, a compression process of the image signal, a process concerning AF (auto focus), a process concerning AE (auto exposure), and the like. Parameters representing the respective modes set up by use of the menu screen are set to the respective sections included in this image processing section, and the image processing is performed thereafter. Here, in terms of the ISO sensitivity on the menu screen, the ISO sensitivity is adjusted by performing pixel mixture in the image processing section 110 in response to the designated ISO sensitivity.

Here, the release button 102 is not pushed yet. Accordingly, the YC signal subjected to the conversion process by the image processing section 110 is supplied to the LCD 160 at a given interval, and the shooting object image is displayed on the display panel 161 (see FIG. 2) of the LCD 160 based on the YC signal supplied at this given interval. The CCD 180, the analog signal processing section 181, the A/D converter 182, and the image processing section 110 are operated synchronously with the timing signal outputted from the CCD controlling section 120, and the image signals generated by the CCD 180 at the given interval are sequentially processed. Therefore, the shooting object located in the direction, on which an image-taking lens is trained, is constantly displayed on the panel of this LCD as the shooting object image. When the release button 102 is pushed at a chance for a good shot while visually checking the shooting object image thus displayed, a distance to the shooting object is measured by an AF section in the image processing section 110 in the half-push operation. The CPU 1101 transmits a result of measurement by the AF section to the focusing controlling section 130, and causes the focusing controlling section 130 to perform position control of the focusing lens. Here, an instruction from the focusing controlling section 130 is transmitted to a driver 131, and causes the driver 131 to drive a focusing lens 1701. The image processing section 110, the focusing lens 1701, the focusing controlling section 130, and the driver 131 collectively constitute a focus adjusting section of the present invention. Moreover, an AE section is also disposed in the image processing section 110. When the AE section measures brightness of field and judges that the field is dark, and if the automatic mode is set up on the menu screen, for example, then the AE section transmits a result of measurement to the flash controlling section 150 to cause the flash controlling section 150 to set off flashlight in the full-push operation. Here, the flashlight is irradiated on the shooting object by supplying a flash start signal from the flash controlling section 150 to an IGBT base in a flash section 151 and thereby allowing a xenon tube to emit light. It is to be noted that the flash is not set off when the automatic mode is set up on the menu screen and if the AE section judges that the field is bright. However, in the forced on mode, the flash is set off at any brightness of field irrespective of the result of measurement.

Moreover, an exposure start signal is supplied from the CCD controlling section 120 to the CCD 180 while using full-push timing of the release button 120 as a starting point, and an exposure end signal is supplied from the CCD controlling section 120 so as to cause the CCD 180 to output all the image signals of the image focused thereon to the analog signal processing section 181 located at a later stage. The image signal processed by the analog signal processing section 181 is supplied to the A/D converter 182 and further to the image processing section 110. After performing the conversion process into the YC signal, the compression process, and the like in the image processing section 110, the image signal is recorded in a memory card (not shown) which is a recording medium. Moreover, when a shooting mode/playback mode switch (not shown) among the group 101 of switches is shifted to a playback mode, the image signal is read out of the memory card and is subjected to a decompression process in the image processing section 110. Thereafter, the shooting image based on the decompressed image signal is displayed on the display panel of the LCD 160.

Here, it is also possible to guide the switching operation of the shooting condition or the switching operation of the mode in the shooting condition by use of audio assist instead of the display on the display panel.

As described above, according to this embodiment, it is possible to realize an image-taking apparatus having an excellent human machine interface which is capable of setting the mode by a simple operation of shaking the image-taking apparatus while utilizing a visual effect.

Next, an image-taking apparatus according to a second embodiment of the present invention will be described. In this second embodiment, the block diagrams for the appearance and the hardware configuration are the same as the foregoing embodiment. Accordingly, reference is made to FIGS. 2 and 3 and duplicate explanations will be omitted herein.

Figure 6:
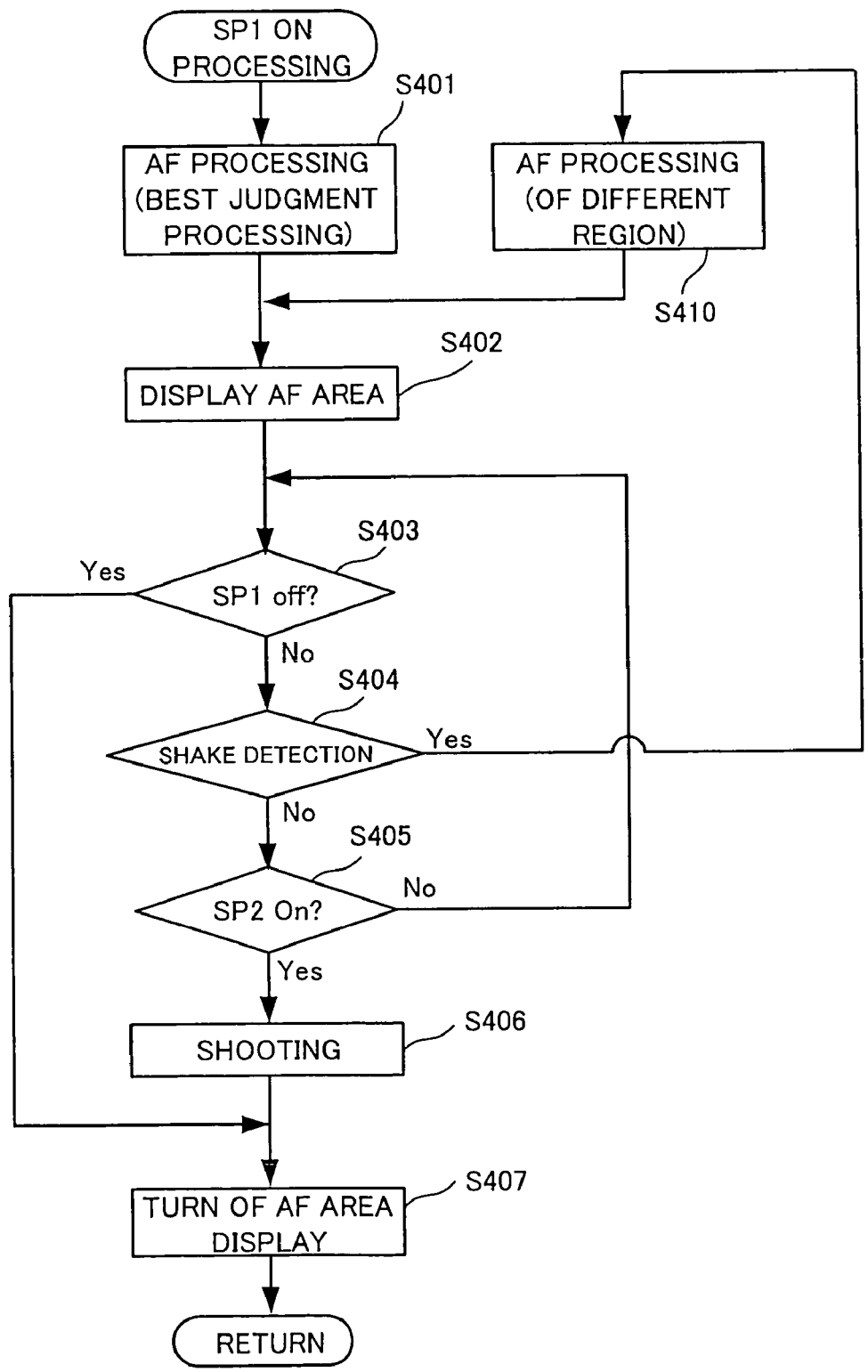
FIG. 6 is a flowchart showing procedures of AF (auto focus) area selection processing to be executed by a CPU (central processing unit) 1101 when a wide-area AF mode is selected.

FIG. 6 is a flowchart showing procedures of AF area selection processing to be executed by the CPU 1101 when a wide-area AF mode is selected.

After selecting the wide-area AF mode, the processing of this flow is started when the release button 102 is set to a half-push (SP1) state. In this flow, SP1 denotes the half-push state and SP2 denotes a fully-push state.

Figure 1:
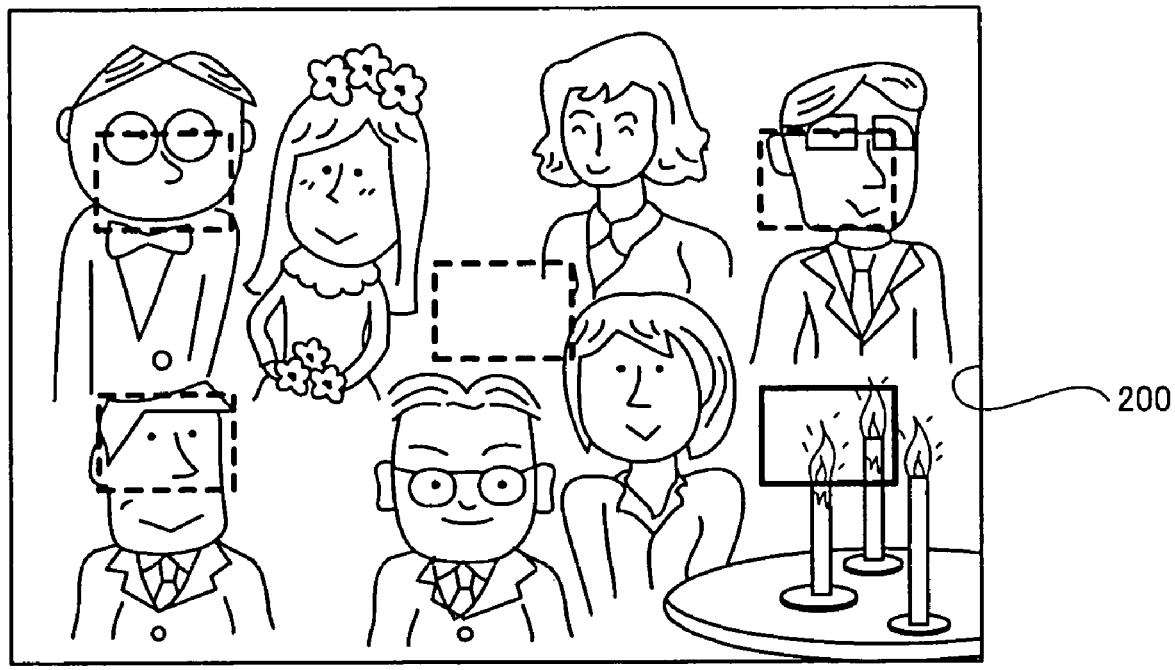
FIG. 1 is a view showing a display screen of a digital camera which is visually checked instead of a finder.

Firstly, any of the areas shown in FIG. 1 is assumed to be set as the AF area and the AF processing is carried out in terms of that area in step S401. The process goes to the next step S402 where the AF areas (indicated with a rectangle) are displayed on the display screen as shown in FIG. 1 and the AF area subjected to the AF processing in step S402 is displayed as a brighter rectangle than other areas (the AF areas are indicated with the dotted lines and the solid line in FIG. 1 and the AF area indicated with the solid line represents the AF area currently subjected to the AF processing). The process goes to the next step S403 where a judgment is made as to whether the release button 102 retreats from the half-push state SP1. When the judgment is made that the release button 102 was in the half-push state but now retreats from that state, the process goes to an Yes side. In step S407, the displayed AF area is turned off and the processing of this flow is terminated.

When the judgment is made in step S403 that the release button 102 remains at the half-push state SP1, then process goes to a No side and shake detection is performed in the next step S404. When a shake is recognized in this step, the process goes to an Yes side. In step S410, the AF area is switched to another AF area different from the previous area. Then, the process goes to step S402 where the switched AF area is indicated with a brighter rectangle than other AF areas.

The similar processing is repeated from step S403 to step S405, and when a judgment is made in step S405 that the release button 102 is set to full-push state (SP2 ON), the process goes to an Yes side. In step S406, image shooting is performed and an image is recorded in the recording medium such as the memory card. In the next step S407, the displayed AF area is turned off and the processing of this flow is terminated.

In this way, it is possible to shift the AF area located on a right end in the beginning to a position around the faces of the groom and the bride by shaking the image-taking apparatus several times. Hence, it is possible to set up the AF area promptly to the location where the user would like to focus on and to perform shooting in due course.

According to the flow shown in FIG. 6, it is possible to process the number of detection of the shakes as a switching signal for the AF area. However, if the shake detection is too sensitive, the AF area may be switched too frequently.

Figure 7:
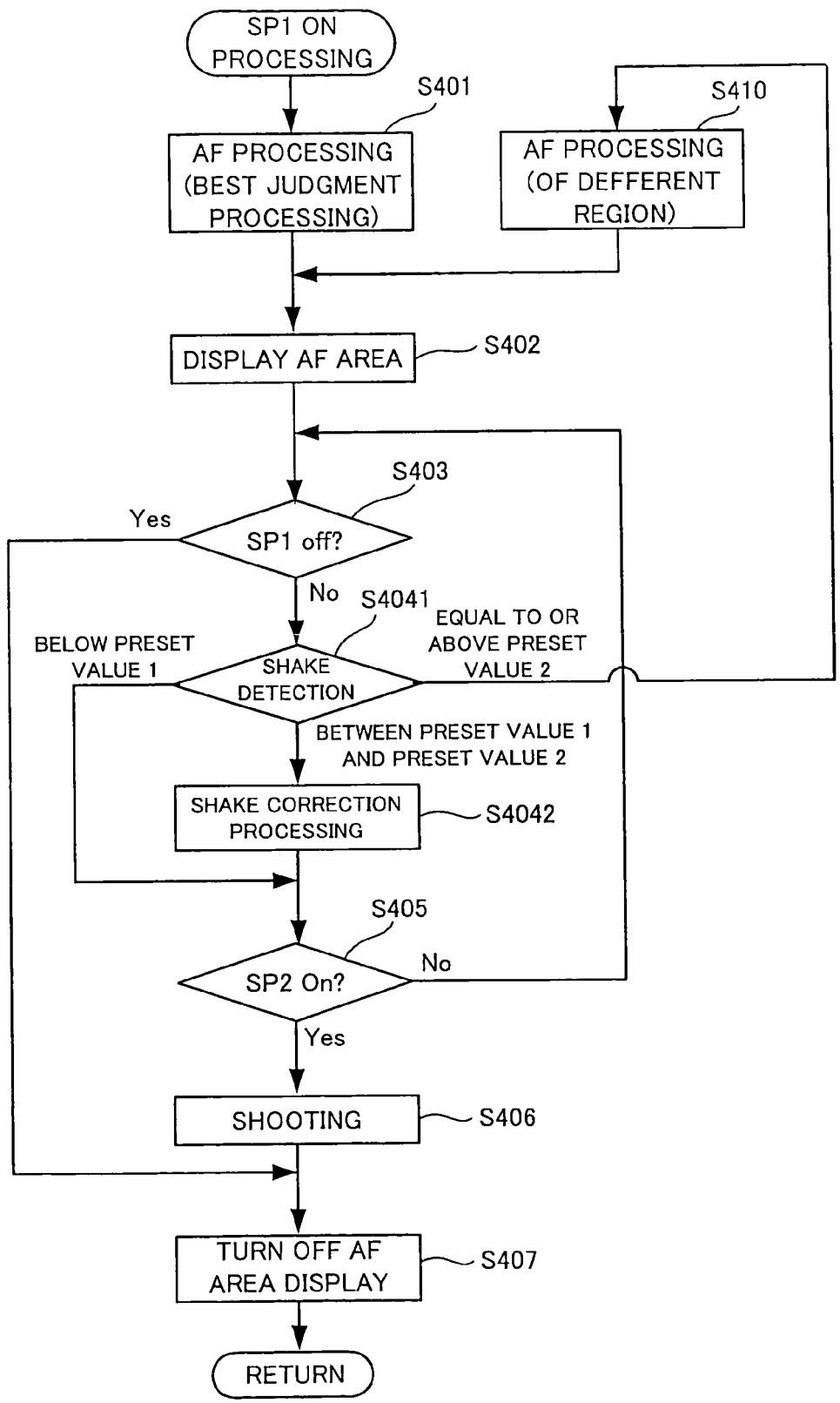
FIG. 7 is a flowchart showing procedures of the AF area selection processing by adding a judgment step to the flow in FIG. 6 so as to be able to judge a shake as an operation to switch an AF area or to judge occurrence of the shake during the AF mode.

Therefore, in a flow shown in FIG. 7, a threshold for judging the degree of the shake of the shake detection sensor is written beforehand in a program stored in the FLASHROM 191. In this way, the image-taking apparatus can judge whether a certain shake is an intentional shake for switching the AF area or an unintentional shake in the course of the shooting operation. Hence, the AF area is not switched too frequently by slight shakes.

In addition, there is a risk that the image becomes out of focus if a shake occurs in the course of setting the AF area. Therefore, two thresholds are set up so that the image-taking apparatus can perform shake correction when the shake occurs during the AF mode.

FIG. 7 is a flowchart showing procedures of the AF area selection processing modified by adding a judgment step S4041 and a shake correction processing step S4042 to the flow in FIG. 6 so as to be able to judge a shake as the operation to switch the AF area or to judge occurrence of the shake during the AF mode.

The flow in FIG. 7 is the same as the flow in FIG. 6 except that the judgment step S4041 and the shake correction processing step S4042 are added thereto. Accordingly, the processing in step S4041 and in step S4042 will be described.

Here, a preset value 1 and a preset value 2 greater than the preset value 1 are written in as the two thresholds, and the processing is modified to judge the timing to switch the AF area when the degree of the shake becomes equal to or above the preset value 2. An assumption is made herein that such a large shake can be generated only by shaking the image-taking apparatus intentionally. By setting the preset value 2 to that level, the shake detection sensor is effectively utilized.

The processing excluding the judgment step S4041 and the shake correction processing step S4042 is identical to the processing described in FIG. 6. Therefore, details of the judgment step S4041 and the shake correction processing step S4042 will be described below.

When the shake detection and a comparative judgment are performed in the judgment step S4041 and the degree of the shake turned out to be below the preset value 1, the process jumps to step S407 without carrying out the shake correction processing. Meanwhile, when the comparative judgment is performed in step S4041 and the degree of the shake turns out to be equal to a value between the preset values 1 and 2, the shake correction processing is carried out in step S4042 to avoid a displacement of the AF area. When the degree of the shake exceeds the preset value 2, the AF area is switched in step S410.

In this way, it is possible to suppress excessive switching of the AF area. In addition, when a user intends to switch the AF area by intentionally shaking the image-taking apparatus, the user can sense an appropriate level of the shake for switching the AF area.

As described above, it is possible to realize the image-taking apparatus which is capable of shooting an image without missing a chance for a good shot in the course of the operation to set up the AF area in a position within the shooting field angle.

In this embodiment, the shake detection sensor is used as the sensor of the present invention. Instead, it is possible to separately provide a biaxial angular acceleration sensor, which can detect vibration in terms of two directions orthogonal to each other (a horizontal direction and a vertical direction, for example).

In this way, it is possible to change the switching direction by use of the direction (whether the horizontal direction or the vertical direction) of vibration instead of sequential switching as described in the embodiment. When there are more than five AF areas as shown in FIG. 1, it may be more convenient if the AF area is switched to the direction of shaking the image-taking apparatus.

Moreover, the embodiments show the examples of performing the TTL ranging either by use of the image pickup device being a passive sensor or by use of a licensor (including the image pickup device) disposed on a photographic light path or on a finder light path. Instead, the image-taking apparatus may be configured to perform another type of ranging different from the TTL ranging, which is conducted by use of an external multipoint ranging sensor provided outside the photographic path.

What is claimed is:

1. An image-taking apparatus comprising:
   an image pickup device which generates an image signal upon receipt of irradiation of a shooting object image;
   an image-taking optical system which includes an optical member for focus adjustment and focuses the shooting object image on the image pickup device;
   a shooting section which causes the image pickup device to generate a recording image signal and records the recording image signal in response to a shooting operation;
   a focus adjusting section which performs focus adjustment by driving the optical member such that a ranging area defined within a shooting field angle constitutes a focused position;
   a sensor, which detects a shake of the image-taking apparatus in a horizontal direction of the image-taking apparatus which indicates a switch between shooting conditions and a shake of the image-taking apparatus in a vertical direction of the image-taking apparatus which indicates a switch between modes of a selected shooting condition selected from a flash mode, a focus mode, a white balance (WB) mode, an International Organization for Standardization (ISO) sensitivity mode, an auto focus (AF) mode, one-point mode, and an automatic exposure (AE) mode;
   controlling means for determining whether the detected shake is an intentional shake or an unintentional shake;
   a shake correcting section which performs a shake correction processing and corrects the determined unintentional shake, and wherein the one point mode selected and the focus adjusting section switches the ranging area to another defined ranging area within the shooting field angle in response to the determined intentional shake, the another defined ranging area being positioned in a direction of the determined intentional shake in terms of the ranging area, and the focus adjusting section does determined intentional shake in terms of the ranging area not switch the ranging area in response to the determined unintentional shake and
   wherein the controlling means determines that the detected shake is the unintentional shake if a degree of the shake is between a first predetermined threshold and a second predetermined threshold, which is greater than the first predetermined threshold, and determines that the detected shake is the intentional shake if the degree of the shake exceeds the second predetermined threshold.

2. The image-taking apparatus according to claim 1, further comprising:
   a plurality of defined ranging areas within the shooting field angle, wherein the focus adjusting section switches the defined ranging areas sequentially from one to another in response to the detected intentional shake.

3. The image-taking apparatus according to claim 1, further comprising:
   a plurality of defined ranging areas within the shooting field angle, wherein the shake is intentionally induced to facilitate the switching of the defined ranging areas by the focus adjusting section.

4. The image-taking apparatus according to claim 3, wherein the focus adjusting section switches the defined ranging areas automatically based on the detected intentional shake.

5. The image-taking apparatus according to claim 1, wherein the focus adjusting section automatically sets the focused point on a ranging area selected from the defined ranging areas, which selected ranging area has the highest shooting object contrast.

6. The image-taking apparatus according to claim 5, wherein the focus adjusting section automatically sets the focused point on the selected ranging area in an absence of the detected intentional shake.

7. The image-taking apparatus according to claim 1, wherein the ranging areas are defined based at least on one of an image content attribute and an object contrast.

* * * * *